United States Patent
Scholand et al.

(10) Patent No.: US 9,265,006 B2
(45) Date of Patent: Feb. 16, 2016

(54) METHOD FOR ADJUSTING A TRANSMIT POWER OF A MULTI CARRIER TRANSMITTER AND A MULTI CARRIER TRANSMITTER

(71) Applicant: Intel Mobile Communications GmbH, Neubiberg (DE)

(72) Inventors: Tobias Scholand, Muelheim (DE); Michael Speth, Krefeld (DE); Dieter Brueckmann, Meerbusch (DE)

(73) Assignee: Intel Deutschland GmbH, Neubiberg (DE)

( * ) Notice: Subject to any disclaimer, the term of this patent is extended or adjusted under 35 U.S.C. 154(b) by 327 days.

(21) Appl. No.: 13/803,189

(22) Filed: Mar. 14, 2013

(65) Prior Publication Data

US 2014/0274191 A1 Sep. 18, 2014

(51) Int. Cl.
| | |
|---|---|
| *H04B 7/00* | (2006.01) |
| *H04W 52/04* | (2009.01) |
| *H04W 52/22* | (2009.01) |
| *H04W 52/14* | (2009.01) |
| *H04W 52/28* | (2009.01) |
| *H04W 52/34* | (2009.01) |

(52) U.S. Cl.
CPC ............ *H04W 52/04* (2013.01); *H04W 52/226* (2013.01); *H04W 52/146* (2013.01); *H04W 52/286* (2013.01); *H04W 52/346* (2013.01)

(58) Field of Classification Search
USPC ............... 455/522, 69–70, 101, 127.1, 127.2; 370/315–320
See application file for complete search history.

(56) References Cited

U.S. PATENT DOCUMENTS

| | | | | |
|---|---|---|---|---|
| 7,580,782 | B2 * | 8/2009 | Breed et al. | 701/45 |
| 8,644,183 | B2 * | 2/2014 | Jiang et al. | 370/252 |
| 2009/0202017 | A1 | 8/2009 | Ichihara | |
| 2013/0100880 | A1 * | 4/2013 | Moren et al. | 370/328 |
| 2013/0343249 | A1 * | 12/2013 | Jiang et al. | 370/311 |

OTHER PUBLICATIONS

"Universal Mobile Telecommunications System (UMTS); User Equipment (UE) Radio Transmission and Reception (FDD)"; 3GPP ETSI TS 125 101 v9.2.0 (Feb. 2010), p. 1-244.
"Universal Mobile Telecommunications System (UMTS); Spreading and Modulation (FDD)"; 3GPP ETSI TS 125 213 v9.1.0 (Jan. 2010), p. 1-40.
"Universal Mobile Telecommunications System (UMTS); Physical Layer Procedures (FDD)"; 3GPP ETSI TS 125 214 v9.1.0 (Jan. 2010), p. 1-100.
"Universal Mobile Telecommunications System (UMTS); High Speed Downlink Packet Access (HSDPA); Overall Description; Stage 2"; 3GPP ETSI TS 125 308 v9.1.0 (Jan. 2010), p. 1-67.
"Universal Mobile Telecommunications System (UMTS); Enhanced Uplink; Overall Description; Stage 2"; 3GPP ETSI TS 125 319 V9.2.0 (Feb. 2010), p. 1-74.

* cited by examiner

*Primary Examiner* — Fayyaz Alam
(74) *Attorney, Agent, or Firm* — Eschweiler & Associates, LLC

(57) ABSTRACT

A method for adjusting a transmit power of a multi carrier transmitter in a mobile communication system includes providing at least two data streams, each data stream to be transmitted on a separate carrier frequency, and determining a transmit signal adaptation metric separately for each of the at least two data streams. The method further includes calculating a combined transmit signal adaptation metric based on the separate transmit signal adaptation metrics, combining the two data streams carried on the two carrier frequencies to an overall transmit signal, and adjusting the transmit power of the overall transmit signal based on the calculated combined transmit signal adaptation metric.

18 Claims, 7 Drawing Sheets ns. In particular, the disclosure relates to methods for adjusting a transmit power in a multi carrier transmitter. The disclosure further relates to multi carrier transmitters and to methods for operating a multi carrier transmitter.

BACKGROUND

During a communication between a user equipment of a radio communications system and a base station, transmission conditions of transmit channels may vary. An uplink transmit power may be adapted to the transmit channel conditions taking into account the different signals of the multi carrier transmitter.

User equipment for use in radio communications systems, components included therein and methods performed by such components constantly have to be improved. In particular, it is desirable to improve the power transmit control. For these and further reasons there is a need for the present disclosure.

BRIEF DESCRIPTION OF THE DRAWINGS

The accompanying drawings are included to provide further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION OF THE DISCLOSURE

Figure 1:
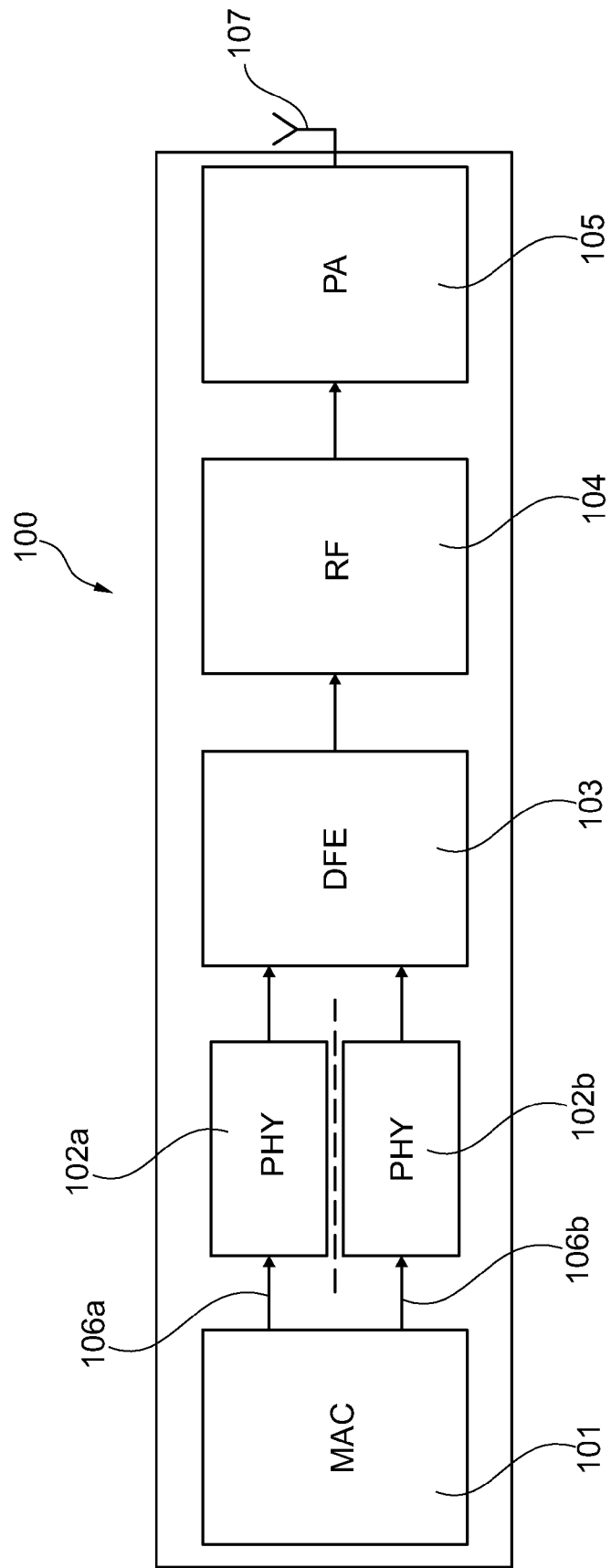
FIG. 1 schematically illustrates functional components of a multi carrier transmitter 100.

In the following, embodiments are described with reference to the drawings wherein like reference numerals are generally utilized to refer to like elements throughout. In the following description, for purposes of explanation, numerous specific details are set forth in order to provide a thorough understanding of one or more aspects. However, it may be evident to a person skilled in the art that one or more aspects may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects are merely examples and that other aspects may be utilized and structural and functional modifications may be made without departing from the scope of the present disclosure. In addition, while a particular feature or aspect may be disclosed with respect to only one of several implementations, such feature or aspect may be combined with one or more other features or aspects of the other implementations as it may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The methods and devices described herein may be used for various wireless communication networks such as Code Division Multiple Access (CDMA), Time Division Multiple Access (TDMA), Frequency Division Multiple Access (FDMA), Orthogonal FDMA (OFDMA) and other networks. The terms "network", "system" and "radio communications system" may be used synonymously. A CDMA network may implement a radio technology such as Universal Terrestrial Radio Access (UTRA), CDMA 2000, etc. UTRA includes wideband-CDMA (W-CDMA) and other CDMA variants. CDMA 2000 covers IS-2000, IS-95 and IS-856 standards. A TDMA network may implement a radio technology such as global system for mobile communications (GSM) and derivatives thereof. The network may be part of Universal Mobile Telecommunication System (UMTS).

In particular, the methods and devices described herein may be based on High Speed Downlink Packed Access (HSDPA) which has been introduced into the release 5 version of the UMTS standards based on W-CDMA multiple access schemes by the "3rd generation partnership project" (3GPP) standardization. HSDPA represents an enhanced 3G mobile radio communications protocol in the high speed packed access family (HSPA). HSDPA allows networks based on UMTS to provide higher data transfer speeds and capacity. Further, the methods and devices described herein may be based on High Speed Uplink Packed Access (HSUPA) which has been introduced into the release 6 version of the UMTS standards based on W-CDMA multiple access schemes by the "3rd generation partnership project" (3GPP) standardization. HSUPA, also known as Enhanced Uplink represents an enhanced 3G mobile radio communications protocol in the high speed packed access family (HSPA) with uplink speeds up to 5.76 Mbit/s.

The contents of the following documents provided by the "3rd Generation Partnership Project" (3GPP) organization are included herein by reference: 3GPP TS 25.308, "High Speed Downlink Packet Access (HSDPA); Overall description; Stage 2", Release 9, 3GPP TS 25.319, "Enhanced uplink; Overall description; Stage 2", Release 9, 3GPP 25.101, "User equipment (UE) radio transmission and reception (FDD)", Release 9, 3GPP TS 25.213, "Spreading and modulation (FDD)", Release 9 and 3GPP TS 25.214, "Multiplexing and channel coding", Release 9".

Today's wireless communication systems may use multi carrier techniques to increase the data throughput of an individual user and/or to increase the cell capacity using frequency diversity of the mobile radio channel. Such technique using dual carriers (DC) has been applied, for example, to the 5 MHz bandwidth third generation frequency division duplex system (3G FDD) for the High Speed Downlink Packed Access (HSDPA) in 3GPP Rel. 9 (25.308 Section 18) and for the High Speed Uplink Packed Access (HSUPA) in 3GPP Rel. 9 (25.319 Section 19) which may serve as an example in what follows. Nevertheless, the principles of the proposed method are not limited to a two carrier system.

To make use of the frequency diversity of the mobile radio channel, the transmit power level of each DC-HSUPA carrier may be adjusted independently. Furthermore, the throughput of each channel may be adjusted independently. Frequency diversity remains for a different fading on different frequencies in a physical transmission channel.

FIG. 1 schematically illustrates an exemplary multi carrier transmitter 100. Transmitter 100 may include as functional components a Medium Access Control (MAC) layer 101, two separate physical layers (PHY) 102a, 102b, a digital front-end (DFE) 103, a radio frequency front-end (RF) 104 and a power amplifier (PA) 105. To approximately double the throughput of the Medium Access Control (MAC) layer 101, transmitter 100, e.g. a DC-HSUPA transmitter, may include two separate physical layers (PHY) 102a, 102b, one for each carrier. Two data streams 106a, 106b may be transmitted from the MAC layer 101 to the two PHY layers 102a, 102b. A combined data stream may be transmitted between the digital front-end 103 to the radio frequency front-end 104 and from the radio frequency front-end 104 to the power amplifier 105. The transmitter 100 may further include an antenna 107 coupled to the power amplifier 105 to send an overall transmit signal over an air interface.

The two data streams 106a, 106b may be intended to be transmitted on two different carrier frequencies. In the following, carrier and carrier frequency may be used in parallel to designate the same fact of transmitting data on a frequency carrier. Each of data streams 106a, 106b may be composed of a high speed dedicated physical control channel (HS-DCPCH), a dedicated channel (DCH) or an enhanced dedicated channel (E-DCH). The DCH may include a dedicated physical control channel (DPCCH) and optionally a dedicated physical data channel (DPDCH), while the E-DCH may include an enhanced dedicated physical control channel (E-DPCCH) and an enhanced dedicated physical data channel (E-DPDCH). Note that the mentioned uplink channels are, inter alia, known from the above-mentioned 3GPP standards. The data streams 106a, 106b may also be composed of other channels or of even only one data channel.

For DC-HSUPA, the two carriers may be adjacent in the frequency domain to allow an optimized RF radio frequency front-end design with respect to power consumption. Actually, instead of having two separate radio frequency front-ends, each having about 5 MHz bandwidth, a single radio frequency front-end 104 having about 10 MHz bandwidth may be used. The separate PHY signals may be mixed together in the digital front end 103 to form an overall combined transmit signal in a base band. The single radio frequency front-end 104 may necessitate only a single power amplifier 105 that may originate an overall transmission power level. The bandwidths mentioned are only exemplary, other bandwidths may be used.

Typically, the single power amplifier 105 may have a non-optimal linearity depending on modulation schemes and relative transmit power levels which may be applied to the different carriers. More specifically, the maximum transmit power level of the overall combined transmit signal may be limited by the non-optimal linearity of the power amplifier and to operate within certain quality margins like the Adjacent Channel Leakage Ratio (ACLR) and/or the Error Vector Magnitude (EVM), as defined in 3GPP 25.101, "User equipment (UE) radio transmission and reception (FDD)", Release 9, Sect. 6. The transmitter 100 may have to take care not to exceed this maximum transmit power level. The available maximum transmit power may be already taken into account in the MAC layer 101. In addition, all subsequent blocks—the physical layers 102a, 102b, the digital front-end 103, the radio frequency front-end 104 and the power amplifier 105 may need to know the actual maximum transmit power level of the overall combined transmit signal.

The modulation scheme of a signal is determined by all physical parameters that are needed for signal generation but the data bits. The data bits are referred to as the transmitted payload or any pilot or control bit pattern transmitted by any data channel. Each transmit signal or data stream consists of one, two or many data channels each having a certain gain (power) and mode setting. The mode settings may contain the data channel modulation scheme like e.g. BPSK, QPSK, 16 QAM etc, OVSF (Orthogonal Variable Spreading Factor) spreading factor, OVSF code number, scrambling code number and carrier frequency. Further parameters that are needed for signal generation may exist.

Depending on the linearity, the transmitter 100 may have different optimal operation points of the power amplifier and the radio frequency front-end with respect to power consumption. In a portable device as a transmitter in a mobile communication system, power resources may be limited due to a limited power capacity of an available power supply which may be, e.g., a battery.

For example, 3GPP introduced a so called 'cubic metric', e.g. in the above cited specification 25.101, in Sect. 6.2. The cubic metric may give an allowed maximum output power reduction with respect to a certain reference maximum output power. The allowed maximum output power reduction may be also called "back-off". The cubic metric may be defined as a statistical property of the overall transmit signal. The cubic metric can be directly used as a required back-off measure to fulfill a certain Adjacent Channel Leakage Ratio requirement. Furthermore, it was found that the cubic metric may be also a good basis to determine the required back-off to fulfill a certain Error Vector Magnitude requirement. This metric or an appropriate other metric may be used for transmit signal adaptation in a feedback scheme. In this case, the overall transmit signal is measured at an output of the power amplifier 105 based on transmit signal samples taken behind the power amplifier and the cubic metric may be determined and fed back to the MAC layer 101 and all intermediate components 102a, 102b, 103, 104 and 105 of the transmitter 100.

In order to keep the adjacent channel leakage ratio in the specified range, the maximum allowed output power may need to be adjusted with the back-off value. This value may depend on the actual signal statistics of the overall transmit signal and varies with different gain and mode settings. The term signal statistics refers to an amplitude distribution or a probability density function of the signal amplitude.

Figure 2:
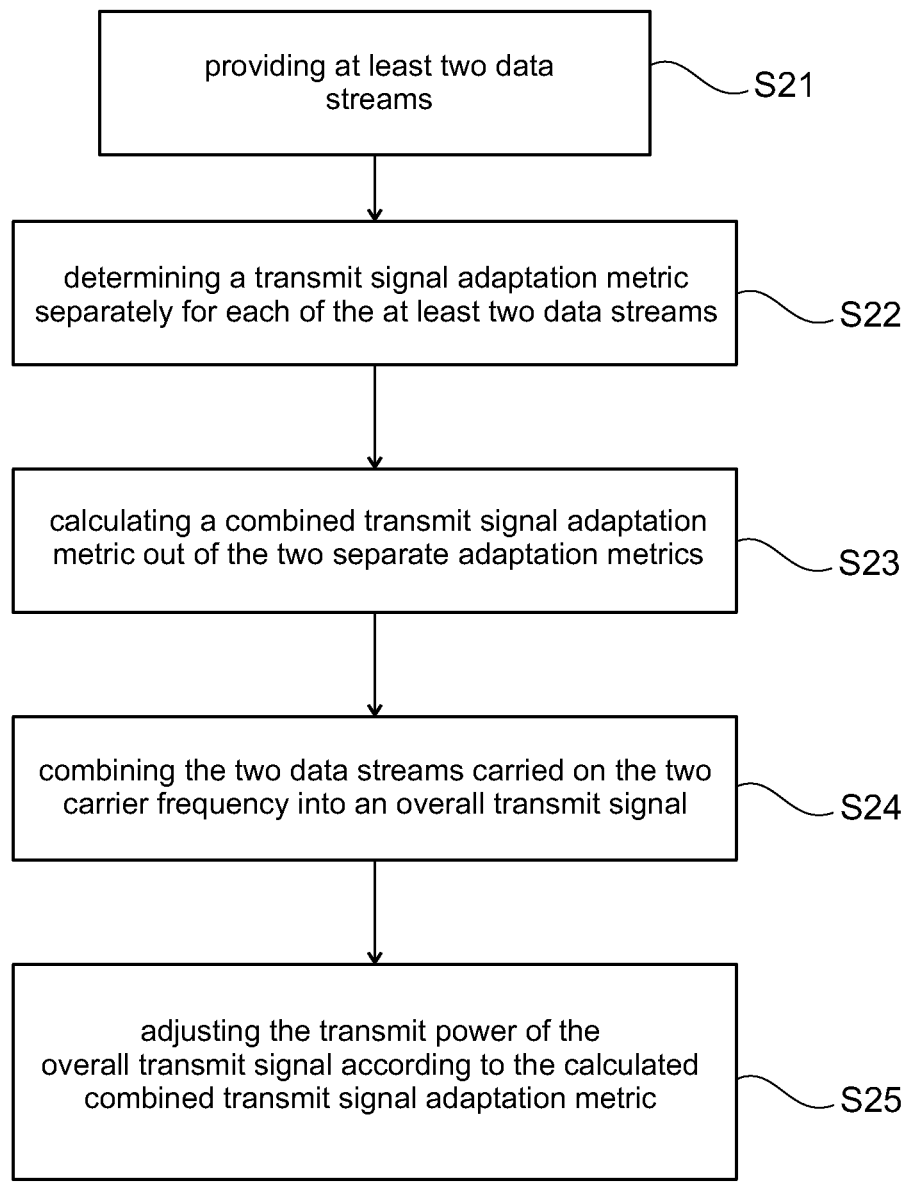
FIG. 2 schematically illustrates a method for adjusting a transmit power.

FIG. 2 shows an exemplary method for adjusting a transmit power of e.g. the multi carrier transmitter 100 of FIG. 1. At S21, at least two data streams are provided. These may be the two data streams 106a, 106b of a DC-HSUPA transmitter. However, the method is not limited to two data streams. Furthermore, the data streams may be differently composed of different data channels.

At S22, a transmit signal adaptation metric may be determined separately for each of the at least two data streams. The transmit signal adaptation metric may be determined based on physical layer parameters which may be available at the end of the MAC layer processing. A more detailed explanation of a possible way of determining the transmit signal adaptation metric will be given below. The expression "determining" is meant to include looking up a value in a look up table as well as calculating the value.

At S23, a combined transmit signal adaptation metric may be calculated out of the two separate adaptation metrics determined at S22. For a multi carrier configuration the number of possible PHY parameter settings for the overall transmit signal can become very large, even already for a dual carrier configuration. The number of possible physical parameter settings for a dual carrier system may be given by NT=NG*N1*N2, where N1 and N2 are the respective numbers of possible settings for a first carrier and a second carrier, and NG is the number of allowed separate gain settings for each carrier. A direct calculation of the combined transmit signal adaptation may require an extremely large memory, since N1 and N2 may be in the range of $10^4$-$10^5$, with NT in the range of $10^9$, still not taking the different settings due to a power imbalance into account. However, it may be possible to calculate a transmit signal adaptation metric for each carrier independently and it may be possible to calculate the combined transmit signal adaptation metric out of the two separate adaptation metrics as is demonstrated below.

At S24, the two data streams carried on the two carrier frequencies may be combined into an overall transmit signal. In FIG. 1 two separate data streams may be fed into digital front-end 103. They may be combined in the digital front-end 103. A combined overall transmit signal may be transmitted between the digital front-end 103 to the power amplifier 105.

At S25, the transmit power of the overall transmit signal may be adjusted according to the calculated combined transmit signal adaptation metric.

The proposed method may use a feed forward approach. Instead of applying a feedback of a transmit signal adaptation metric which was estimated in the prior art based on overall transmit signal samples, the transmit signal adaptation metric may be now calculated from PHY parameters before transmit signal generation. Generation of the transmit signal may take the transmit signal adaptation metric already into account. Thus, the latency problem associated with a feedback scheme may be avoided.

Proposed is a novel multi-carrier transmit signal adaptation metric which may be calculated by first calculating separate metrics for each of the carriers and then combining them to a combined transmit signal adaptation metric. Without that novel approach, the complexity and/or power consumption of a feed forward system may be too cumbersome and not feasible for implementation in wireless chip sets.

Figure 3:
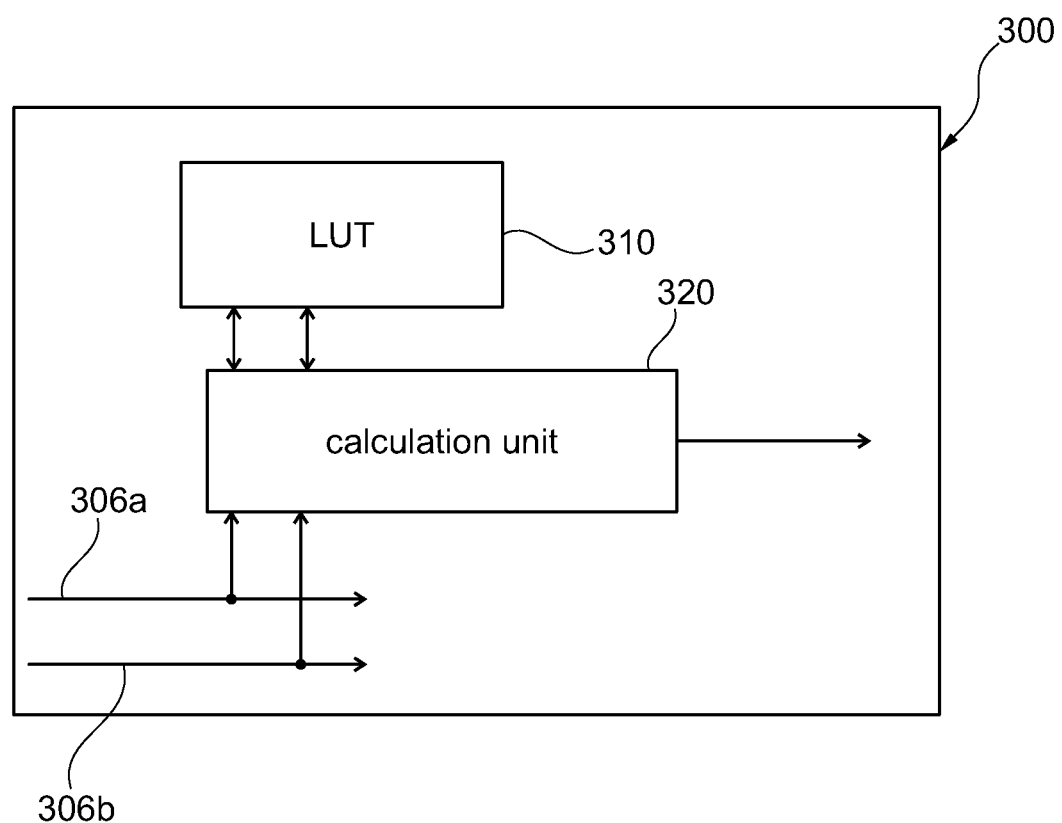
FIG. 3 schematically illustrates a multi carrier transmitter 300 including a look up table and a calculation unit.

FIG. 3 schematically illustrates an exemplary multi carrier transmitter 300 configured to implement the method described with reference to FIG. 2. Transmitter 300 may include a look up table 310 and a calculation unit 320. Look up table 310 may be configured to store pre-calculated transmit signal adaptation metric values for a data stream based on possible data stream configurations.

Possible DC-HSUPA physical parameters which may be taken into account can e.g. include: transmit power of each active carrier; scrambling code number of each active carrier; carrier spacing (typically 5 MHz but not limited thereto); transmit power of each active CDMA physical channel (reflected in gain mode settings); spreading factor of each active CDMA physical channel; and Orthogonal Variable Spreading Factor (OVSF) Code number of each active CDMA physical channel.

Calculation unit 320 may be configured to retrieve the transmit signal adaptation metric values from the look up table 310 for each data stream to be transmitted based on an actual data stream configuration of each data stream and to calculate based on the retrieved values a combined transmit signal adaptation metric.

Two data streams 306a, 306b may be provided, e.g. by a MAC layer not shown in FIG. 3. Calculation unit 320 may take from each data stream the actual configuration and may look up in the look up table 310 the corresponding transmit signal adaptation metric values for each data stream 306a, 306b separately. As allowed settings for the two data streams may be the same, or more specifically the settings for the second data stream may be a subset of the values for the first data stream, the same look up table can be used for both data streams. The look up table can be implemented by any form of electronic memory.

Calculation unit 320 may be further configured to calculate based on the retrieved values a combined transmit signal adaptation metric. The calculated combined transmit signal adaptation metric can then be used in transmitter 300 as known in the art to adapt the combined signal to not exceed a transmit power level of the overall combined transmit signal.

In another transmitter not shown in the figures, it may be also possible that a calculation unit may be provided that may be adapted to calculate by polynomial approximation or by interpolation a transmit signal adaptation metric for each carrier separately without looking up values in a look up table.

Figure 4:
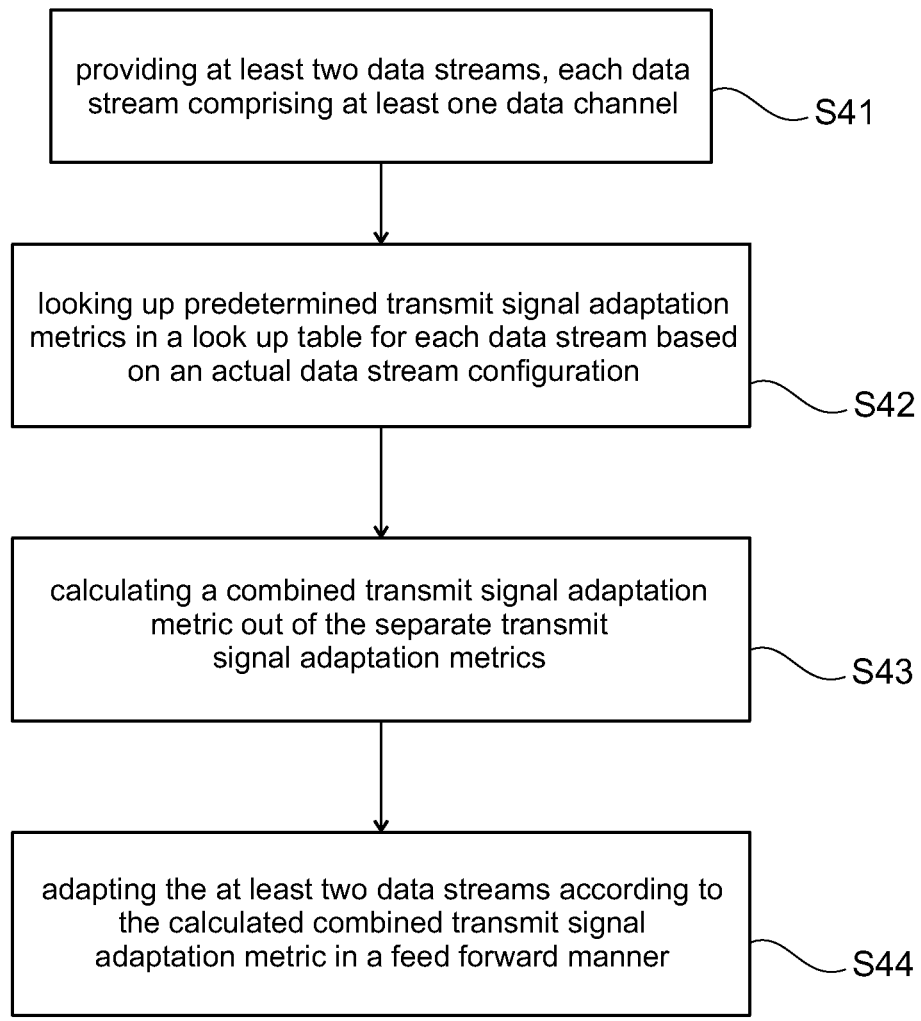
FIG. 4 schematically illustrates a method for operating a multi carrier transmitter.

FIG. 4 illustrates an exemplary method for operating e.g. the multi carrier transmitter 300. At S41, at least two data streams to be transmitted on the multi carriers may be provided, with each data stream, e.g. data streams 306a, 306b, including at least one data channel.

At S42, predetermined transmit signal adaptation metrics may be looked up in a look up table 310 for each data stream 306a, 306b based on an actual data stream configuration.

At S43, a combined transmit signal adaptation metric may be calculated out of the separate transmit signal adaptation metrics. The combined transmit signal adaptation metric may be not calculated based on the combined signal. The calculation to be effectuated in the calculation unit 320 may be much easier and may require less calculation power than a calculation based on a combined signal, because it may be based on retrieved values for the separate data streams of the separate carriers.

At S44, the at least two data streams to be transmitted on the multi carriers may be adapted according to the calculated combined transmit signal adaptation metric in a feed forward manner. Adaptation may be done in any functional component of the transmitter, i.e. on the two data stream separately and/or on the combined data signal.

Figure 5:
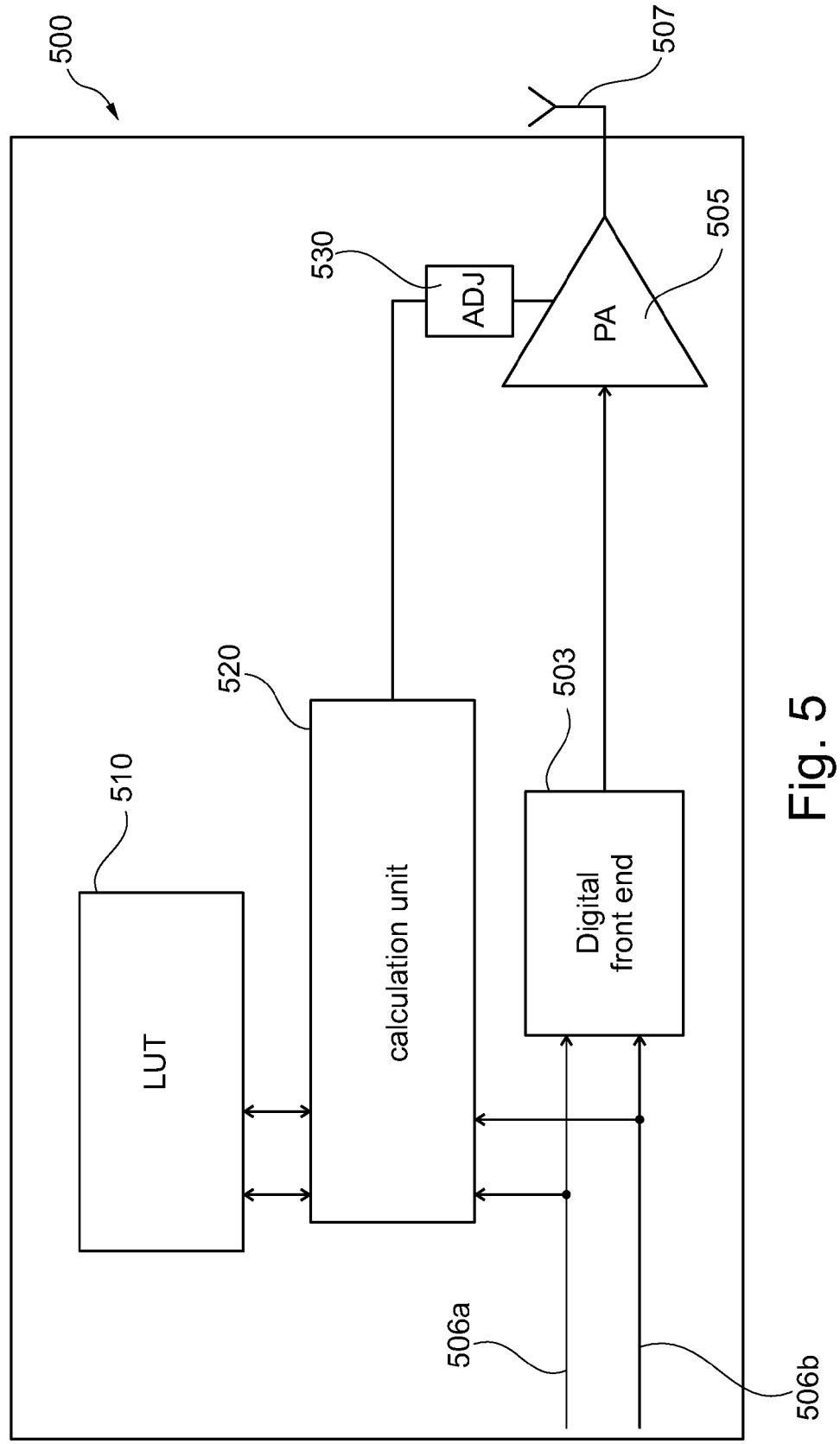
FIG. 5 schematically illustrates a multi carrier transmitter 500 including a power amplifier.

FIG. 5 shows an exemplary transmitter 500. Transmitter 500 may include a look up table 510 and a calculation unit 520. Look up table 510 and calculation unit 520 may correspond to look up table 310 and calculation unit 320 shown in FIG. 3. Transmitter 500 may include a digital front-end 503, an adjustment unit (ADJ) 530, a power amplifier (PA) 505 and an antenna 507. Two data streams 506a, 506b may be provided, e.g. by the MAC layer which is not shown in FIG. 5. Calculation unit 520 may take from each data stream the actual configuration and may look up in the look up table 510 the corresponding transmit signal adaptation metric values for each data stream 506a, 506b separately.

Calculation unit 520 may be further configured to calculate based on the retrieved values a combined transmit signal adaptation metric. Data streams 506a, 506b may be fed to the digital front-end 503 where the two data streams may be combined. The combined signal may be transmitted to the power amplifier 505. The calculated combined transmit signal adaptation metric may be transmitted to adjustment unit

530. Adjustment unit 530 may use the metric to adjust an amplification factor of power amplifier 505. Thus, an overall transmit signal may be sent to the antenna 507 which may respect the quality margins like the ACLR and/or the EVM.

Figure 6:
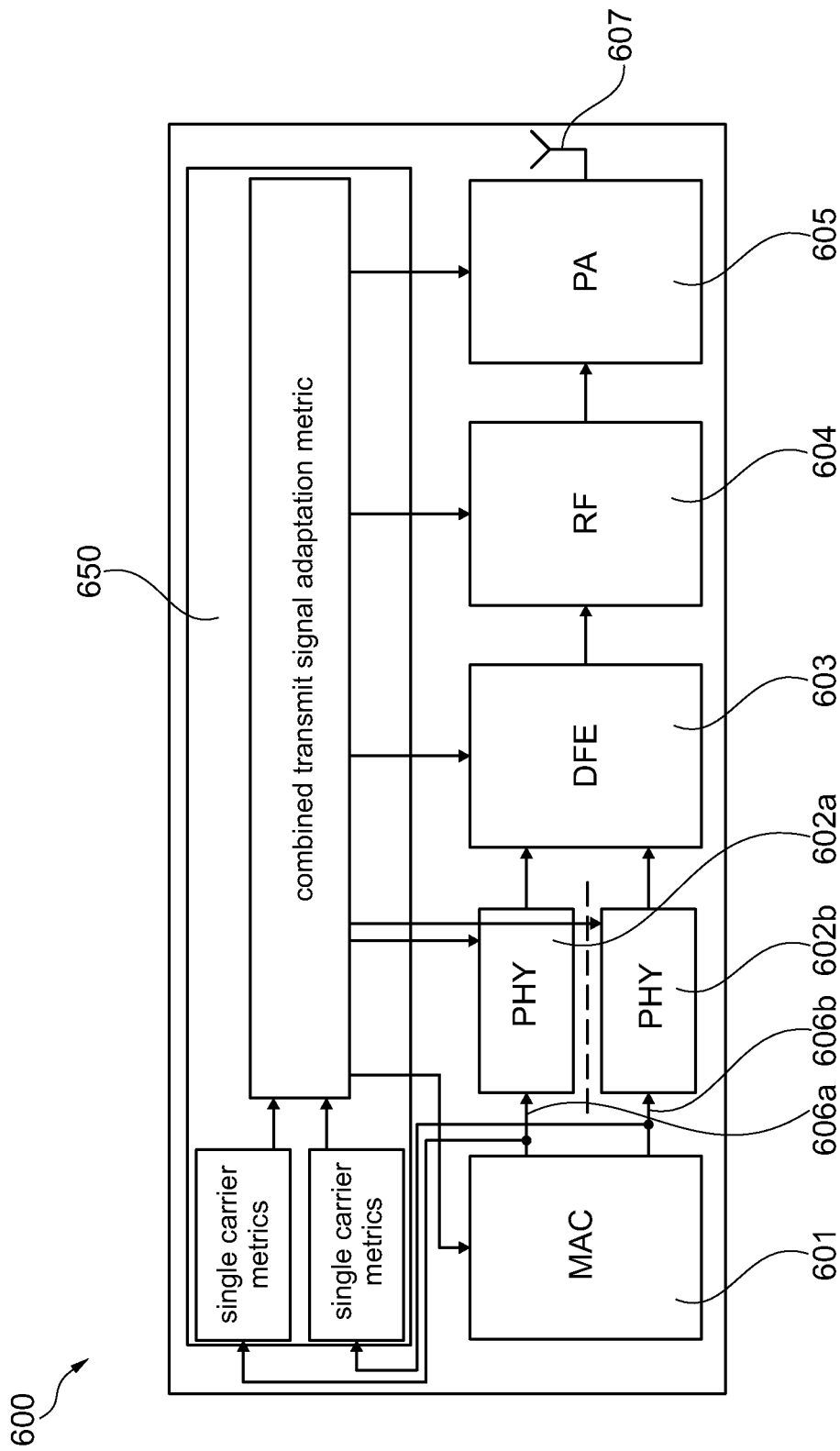
FIG. 6 schematically illustrates functional components of a multi carrier transmitter 600.

FIG. 6 schematically illustrates an exemplary multi carrier transmitter 600. Transmitter 600 may include a Medium Access Control (MAC) layer 601, two separate physical layers (PHY) 602a, 602b, a digital front-end (DFE) 603, a radio frequency front-end (RF) 604, a power amplifier (PA) 605 and an antenna 607 coupled to the power amplifier. Two data streams 606a, 606b may be transmitted from the MAC layer 601 to the two PHY layers 602a, 602b. A combined data stream may be transmitted between the digital front-end 603 to the radio frequency front-end 604 and from the radio frequency front-end 604 to the power amplifier 605. The transmitter 600 may further include an adaptation unit 650.

Adaptation unit 650 may receive physical parameters descriptive of the two data streams 606a and 606b. Adaptation unit 650 may determine single carrier metrics for each of the two data streams separately. Based on the two single carrier metrics, adaptation unit 650 may calculate a combined transmit signal adaptation metric. The combined transmit signal adaptation metric may be used in the MAC layer 601, in the two separate physical layers 602a, 602b, in the DFE 603, in the radio frequency front-end 604 and in the power amplifier 605 to adjust the overall transmit power.

Adaptation unit 650 may determine the single carrier metrics by looking up the values in a look up table based on the physical parameters. In fact, due to the limited number of gain and mode settings per carrier, the single carrier metrics can be calculated in a closed mathematical form. All possible values for different data stream configurations may therefore be pre-computed and stored in a memory in the transmitter 600. In another embodiment, adaptation unit 650 may be configured to compute the single carrier metrics by using a polynomial approximation based on the actual physical parameters. In another embodiment, adaptation unit 650 may be configured to compute the single carrier metrics by interpolation. Of course, a mixture of the three methods above is also possible.

Figure 7:
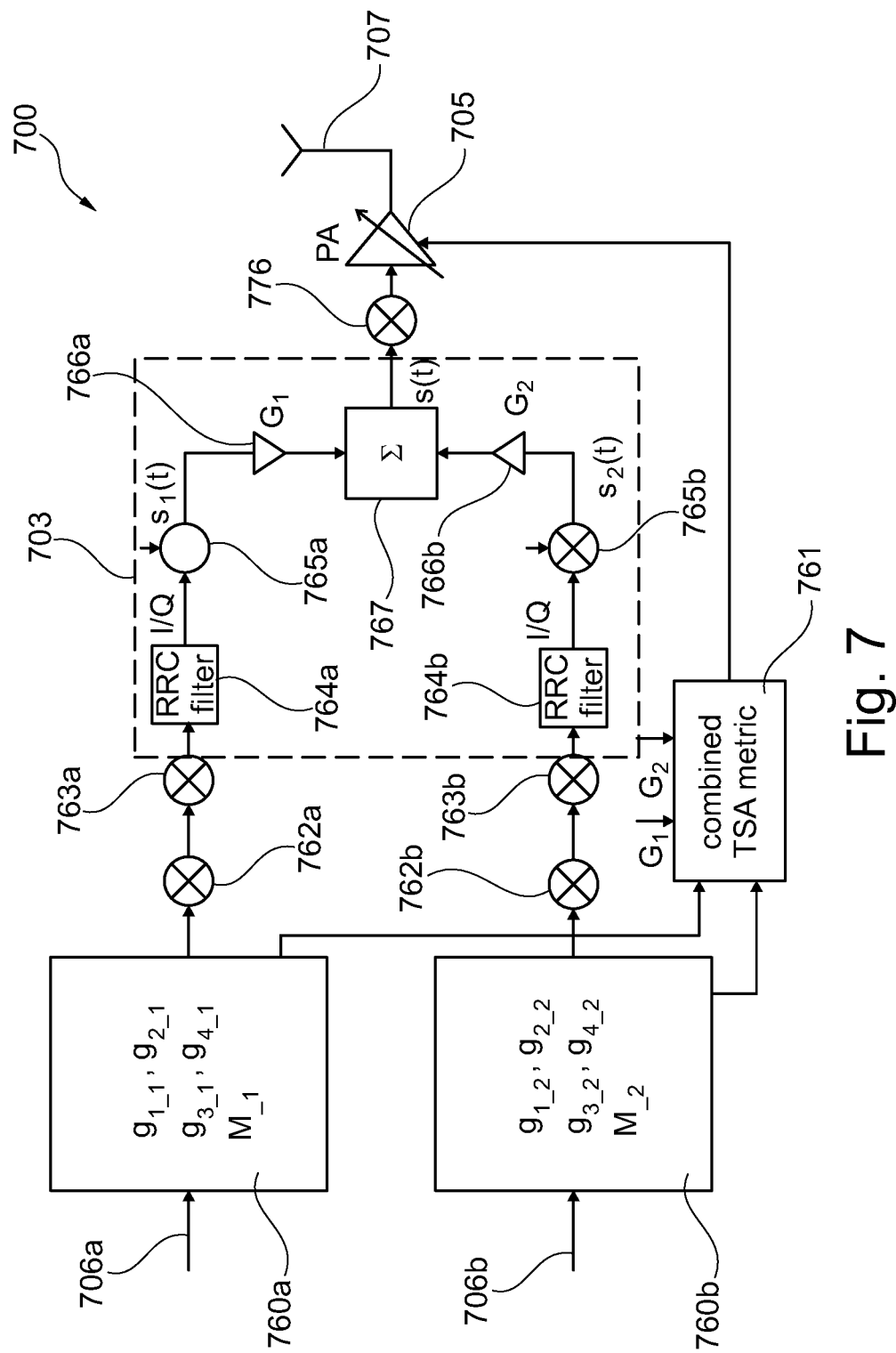
FIG. 7 schematically illustrates a multi carrier transmitter 700 in more detail.

In the following, determining a transmit signal adaptation metric for each carrier independently and calculating a combined transmit signal adaptation metric out of the single carrier metrics will be explained in more detail. For a better understanding of the following explanation, FIG. 7 shows a more detailed block diagram of a dual carrier transmitter 700 for a CDMA system e.g. specified for 3GPP UMTS (see 25.319, 25.101, 25.213, 25.214) in one embodiment.

Transmitter 700 may be adapted to transmit two data streams 706a, 706b. Each data stream may be composed of four separate channels each. In a typical system such as specified for DC-HSUPA, the channels may be spread individually and scaled by gain factors. The channels may be coded and multiplexed. The gain factors are physical parameters in the understanding of the present specification. The respective gain values for the individual channels forming data stream 706a are $g_{1\_1}$, $g_{2\_1}$, $g_{3\_1}$, and $g_{4\_1}$ and for the individual channels forming data stream 706b the gain values are n respectively. Further physical layer parameters specifying the two data streams are $M_{\_1}$ and $M_{\_2}$, respectively, which refer to the mode of the modulation scheme. The physical layer parameters are indicated in FIG. 7 in a block 760a and 760b, respectively. The physical layer parameters may be fed into a block 761 for determination of the combined transmit signal adaptation metric.

Data streams 706a and 706b may be time dependent signals $s_1(t)$ and $s_2(t)$. They may be separately scaled in multipliers 762a and 762b. The data streams 706a and 706b may be further separately scrambled in multipliers 763a and 763b. A dashed line 703 indicates the digital front-end of transmitter 700. Digital front-end 703 may include an RRC (root-raised-cosine) filter 764a, 764b for each data stream. The signals $s_1(t)$ and $s_2(t)$ in FIG. 7 may refer to complex valued signals having I and Q-paths describing the equivalent baseband signals of the two data streams. The digital front-end 703 may further include a multiplier 765a, 765b for each data stream, an amplifier 766a, 766b for each data stream, and a combiner 767. Transmitter 700 may further include a radio frequency mixer 770, an adjustable power amplifier 705 and an antenna 707.

Each data stream $s_1(t)$ and $s_2(t)$ may be composed of e.g. four channels by channel coding and multiplexing and scaled in multipliers 763a and 763b to the same root mean square value. In each signal path the scramblers 763a and 763b generate quadrature components of $s_1(t)$ and $s_2(t)$ which may be uncorrelated.

In multipliers 765a, 765b the data streams may be modulated to have the respective carrier spacing, i.e. in multiplier 765a the data stream $s_1(t)$ may be multiplied with $e^{j\omega_0 t}$ and in multiplier 765b the data stream $s_2(t)$ may be multiplied with $e^{-j\omega_0 t}$, $\omega_0$, representing half of the respective carrier spacing. To respond to any power imbalance between the two signals $s_1(t)$ and $s_2(t)$, both signals may be amplified with a respective gain factor $G_1$ or $G_2$ in amplifiers 766a and 766b. The two signals $s_1(t)$ and $s_2(t)$ may be then added up to the output signal s(t) in combiner 767. The combined signal may be output from digital front-end 703.

In radio frequency mixer 770 the combined signal s(t) may be mixed to the radio frequency. The RF output signal may be amplified by power amplifier 705. In order to keep the adjacent channel leakage ratio in the specified range, the maximum allowed output power may be adjusted with the back-off value. This value may depend on the actual signal statistics of s(t) and may vary with different gain and mode settings. The back-off value may be determined as a combined transmit signal adaptation metric in block 761 and the power amplifier 705 may be adjusted accordingly. The signal output from power amplifier 705 may be fed to antenna 707 to be transmitted via an air interface.

Typically, as mentioned before, there may be no closed mathematical form to calculate the combined transmit signal adaptation metric from the influencing physical parameters. Therefore, the signal statistics may be determined for each carrier separately and the single carrier moments may be combined to the overall transmit signal adaptation metric.

A so-called raw transmit signal adaptation metric RCM of a signal s(t) for a single carrier can be determined by the following expression $$RCM = \text{RMS}\left(\left(\frac{|s(t)|}{\text{RMS}(s(t))}\right)^3\right) = \sqrt{\frac{\overline{|s(t)|^6}}{\overline{|s(t)|^2}^3}} \quad (1)$$

where RMS stands for root mean square. As already mentioned, the power back-off for a power amplifier can be directly obtained from this value. According to equation (1), the $2^{nd}$ and $6^{th}$ moments of s(t) may need to be determined. Due to the limited number of gain and mode settings per data stream, this can e.g. be performed by using a table look-up technique or by a polynomial approximation method.

More specifically, all possible values can be e.g. pre-computed in a closed mathematical form and may be stored in a memory. A closed mathematical form may be e.g. possible if the number of possible physical parameters is limited. However, it may be also possible to measure the moments using a simulated random bit signal having the same physical parameters before and store these values in a look up table in a memory. The values may also be computed by a polynomial approximation or computed by interpolation or computed by a mixture of the three methods above. Computing values by a polynomial approximation or by interpolation may be done directly in the transmitter. Any suitable technique may be used for calculating the $2^{nd}$ and $6^{th}$ moments of s(t) for a single carrier with a limited number of possible physical parameters. Furthermore, any suitable technique may be used for calculating the $4^{th}$ and $6^{th}$ moments, which may be used as shown below, of s(t) for a single carrier with a limited number of possible physical parameters.

In the following it will be shown how to determine the transmit signal adaptation metric for a dual carrier system from the individual moments of the signals in the two branches, i.e., for the two data streams. This method can be applied, if some restrictions to the signals are fulfilled.

As shown in FIG. 7, $s_1(t)$ and $s_2(t)$ may be the signals in the two branches which may be assessed with the gains $G_1$ and $G_2$ to respond to power imbalances and may be added up to an output signal s(t). Thus, the output signal s(t) may be given by $$s(t) = G_1 \cdot s_1(t) + G_2 \cdot s_2(t) \quad (2a)$$
$$= G_1 \cdot a_1 + jG_1 \cdot b_1 + G_2 \cdot a_2 + jG_2 \cdot b_2 \quad (2b)$$

with $a_1 = Re\{s_1(t)\}; b_1 = Im\{s_1(t)\}$ $a_2 = Re\{s_2(t)\}; b_2 = Im\{s_2(t)\}$ Assuming that $s_1(t)$ and $s_2(t)$ may be uncorrelated and their mean values may be zero, which may hold e.g. for the signals specified for DC-HSUPA, the mean square value of s(t) may be given by $$\overline{|s^2(t)|} = G_1^2 \cdot \overline{|s_1^2(t)|} + G_2^2 \cdot \overline{|s_2^2(t)|} \quad (3)$$
$$= G_1^2 \overline{(a_1^2 + b_1^2)} + G_2^2 \overline{(a_2^2 + b_2^2)}$$

By scaling $s_1(t)$ and $s_2(t)$ to the same RMS value and due to scrambling, the following relationships may hold for the 2nd moments $$\overline{a_1^2} = \overline{b_1^2} = \overline{a_2^2} = \overline{b_2^2} \quad (4)$$

Therefore, equation (3) may simplify to $$\overline{|s^2(t)|} = 2 \cdot (G_1^2 + G_2^2) \cdot \overline{a_1^2} \quad (5)$$

Due to the scaling operation in multipliers 762a, 762b, $\overline{a_1^2}$ may be a constant for all possible adjustments, thus the 2nd moment of s(t) can be directly determined from the gain values $G_1$ and $G_2$. Gain values $G_1$ and $G_2$ may express a power imbalance between the two carrier signals.

Furthermore, the 6th moment of s(t) may be required for computation of the transmit signal adaptation metric. The 6th moment of s(t) can be determined by:

$$\overline{|s^6(t)|} = \overline{[(G_1 \cdot a_1 + G_2 \cdot a_2)^2 + (G_1 \cdot b_1 + G_2 \cdot b_2)^2]^3} \quad (6a)$$
$$= \overline{(A^2 + B^2)^3} \quad (6b)$$
$$= \overline{A^6} + \overline{3A^4B^2} + \overline{3A^2B^4} + \overline{B^6} \quad (6c)$$

with $A^2 = (G_1 \cdot a_1 + G_2 \cdot a_2)^2;$ $B^2 = (G_1 \cdot b_1 + G_2 \cdot b_2)^2;$ Thus, for $\overline{A^6}$ holds:

$$\overline{A^6} = G_1^6 \overline{a_1^6} + 6G_1^5 G_2 \overline{a_1^5 a_2} + 15 G_1^4 G_2^2 \overline{a_1^4 a_2^2} + 20 G_1^3 G_2^3 \overline{a_1^3 a_2^3} + 15 G_1^2 G_2^4 \overline{a_1^2 a_2^4} + 6 G_1 G_2^5 \overline{a_1 a_2^5} + G_2^6 \overline{a_2^6} \quad (7)$$

Under the assumption that $s_1(t)$ and $s_2(t)$ may be uncorrelated, $a_1$ and $a_2$ may be also uncorrelated. Furthermore, the 1st moment may be zero, and the odd moments may be small. Therefore, the relationship may simplify to $$\overline{A^6} = G_1^6 \overline{a_1^6} + 15 G_1^4 G_2^2 \cdot \overline{a_1^4} \cdot \overline{a_2^2} + 15 G_1^2 G_2^4 \cdot \overline{a_1^2} \cdot \overline{a_2^4} + G_2^6 \overline{a_2^6} \quad (8)$$

For the 6th moment of B respectively holds $$\overline{B^6} = G_1^6 \overline{b_1^6} + 15 G_1^4 G_2^2 \cdot \overline{b_1^4} \cdot \overline{b_2^2} + 15 G_1^2 G_2^4 \cdot \overline{b_1^2} \cdot \overline{b_2^4} + G_2^6 \overline{b_2^6} \quad (9)$$

Thus, using (4) we may obtain $$\overline{B^6} = \overline{A^6} \quad (10)$$

Taking into account that $s_1$ and $s_2$ may be uncorrelated, the term $\overline{A^4 B^2}$ can be determined as follows $$\overline{A^4 B^2} = \overline{(G_1^4 a_1^4 + 4G_1^3 G_2 a_1^3 a_2 + 6 G_1^2 G_2^2 a_1^2 a_2^2 + 4 G_1 G_2^3 a_1 a_2^3 + G_2^4 a_2^4) \cdot (G_1^2 b_1^2 + 2 G_1 G_2 b_1 b_2 + G_2^2 b_2^2)} \quad (11)$$
$$= G_1^6 \cdot \overline{a_1^4 b_1^2} + 4 G_1^5 G_2 \cdot \overline{a_1^3 b_1^2} \cdot \overline{a_2} + 6 G_1^4 G_2^2 \cdot \overline{a_1^2 b_1^2} \cdot \overline{a_2^2} + 4 G_1^3 G_2^3 \cdot \overline{a_1 b_1^2} \cdot \overline{a_2^3} +$$
$$G_1^2 G_2^4 \cdot \overline{a_2^4 \cdot b_1^2} + 2 G_1^5 G_2 \cdot \overline{a_1^4 b_1} \cdot \overline{b_2} + 8 G_1^4 G_2^2 \cdot \overline{a_1^3 b_1} \cdot \overline{a_2 b_2} + 12 G_1^3 G_2^3 \cdot \overline{a_1^2 b_1} \cdot \overline{a_2^2 b_2} +$$
$$8 G_1^2 G_2^4 \cdot \overline{a_1 b_1} \cdot \overline{a_2^3 b_2} + 2 G_1 G_2^5 \cdot \overline{a_2^4 b_2} \cdot \overline{b_1} + G_1^4 G_2^2 \cdot \overline{a_1^4} \cdot \overline{b_2^2} + 4 G_1^3 G_2^3 \cdot \overline{a_1^3} \cdot \overline{a_2 b_2^2} +$$
$$6 G_1^2 G_2^4 \cdot \overline{a_1^2} \cdot \overline{a_2^2 b_2^2} + 4 G_1 G_2^5 \cdot \overline{a_1} \cdot \overline{a_2^3 b_2^2} + G_2^6 \cdot \overline{a_2^4 b_2^2}$$

Based on the properties of the outputs of scramblers 763a, 763b that $a_1$ and $b_1$ as well as $a_2$ and $b_2$ may be uncorrelated, and the 1st moments may be zero, this relationship can be simplified to $$\overline{A^4 B^2} = G_1^6 \cdot \overline{a_1^4 b_1^2} + 6 G_1^4 G_2^2 \cdot \overline{a_1^2 b_1^2} \cdot \overline{a_2^2} + G_1^2 G_2^2 \cdot \overline{a_2^4 b_1^2} + G_1^4 G_2^2 \cdot \overline{a_1^4} \cdot \overline{b_2^2} + 6 G_1^2 G_2^4 \cdot \overline{a_1^2} \cdot \overline{a_2^2 b_2^2} + G_2^6 \cdot \overline{a_2^4 b_2^2} \quad (12)$$

For the mean value of $A^2 B^4$ following relationship can be derived $$\overline{A^2B^4} = G_1^6 \cdot \overline{a_1^2 b_1^4} + 6G_1^4 G_2^2 \cdot \overline{a_1^2 b_1^2} \cdot \overline{b_2^2} + G_1^4 G_2^2 \cdot \overline{a_2^2} \cdot \overline{b_1^4} + G_1^2 G_2^4 \cdot \overline{a_1^2 b_2^4} + 6G_1^2 G_2^4 \cdot \overline{b_1^2} \cdot \overline{a_2^2 b_2^2} + G_2^6 \cdot \overline{a_2^4 b_2^2}$$ (13)

Thus, the 6th moment of s(t) can be determined by $$\overline{|s^6(t)|} = G_1^6 \cdot \overline{(a_1^6 + b_1^6)} + G_2^6 \cdot \overline{(a_2^6 + b_2^6)} + 15 G_1^4 G_2^2 \cdot \overline{(a_1^4 \cdot a_2^2 + b_1^4 \cdot b_2^2)} +$$ (14)
$$40 G_1^3 G_2^3 \overline{a_1^3} \cdot \overline{a_2^3} + 15 G_1^2 G_2^4 \cdot \overline{(a_1^2 \cdot a_2^4 + b_1^2 \cdot b_2^4)} +$$
$$3 G_1^6 \cdot \overline{(a_1^4 \cdot b_1^2 + a_1^2 \cdot b_1^4)} + 3 G_2^6 \cdot \overline{(a_2^4 \cdot b_2^2 + a_2^2 \cdot b_2^4)} +$$
$$3 G_1^4 G_2^2 \cdot \overline{(a_1^4 \cdot b_2^2 + b_1^4 \cdot a_2^2)} + 3 G_1^2 G_2^4 \cdot \overline{(a_2^4 \cdot b_1^2 + a_1^2 \cdot b_2^4)} +$$
$$18 G_1^4 G_2^2 \cdot \overline{a_1^2 \cdot b_1^2} \cdot \overline{(a_2^2 + b_2^2)} + 18 G_1^2 G_2^4 \cdot \overline{a_2^2 \cdot b_2^2} \cdot \overline{(a_1^2 + b_1^2)}$$

Due to the scrambling operation in multipliers 763a, 763b the moments of the signals in the I-path and in the Q-path may be the same. Furthermore, the 3rd order moments may be small compared to the even order moments and can be neglected. Thus above relationship simplifies to $$\overline{|s^6(t)|} = 2 G_1^6 \cdot \overline{a_1^6} + 2 G_2^6 \cdot \overline{a_2^6} + 36 G_1^4 G_2^2 \cdot \overline{a_1^4 \cdot a_2^2} +$$ (15)
$$36 G_1^2 G_2^4 \cdot \overline{a_1^2 \cdot a_2^4} + 3 G_1^6 \cdot \overline{a_1^4 \cdot b_1^2} + 3 G_2^6 \cdot \overline{a_2^4 \cdot b_2^2} + 3 G_1^6 \cdot \overline{a_1^2 \cdot b_1^4} +$$
$$3 G_2^6 \cdot \overline{a_2^2 \cdot b_2^4} + 36 G_1^4 G_2^2 \cdot \overline{a_1^2 \cdot b_1^2 \cdot a_2^2} + 36 G_1^2 G_2^4 \cdot \overline{a_2^2 \cdot b_2^2 \cdot a_1^2}$$

Based on this relationship, $\overline{|s^6(t)|}$ can be calculated from the individual moments of each carrier, where following moments, i.e the $2^{nd}$, the $4^{th}$ and the $6^{th}$ moments, may be required $$M_{6x} = \overline{a_x^6}; M_{4x} = \overline{a_x^4}; M_{2x} = \overline{a_x^2}$$

$$M_{42x} = \overline{a_x^4 \cdot b_x^2}; M_{24x} = \overline{a_x^2 \cdot b_x^4}; M_{22x} = \overline{a_x^2 \cdot b_x^2},$$

for x=1,2.

These values can be either stored in a memory and loaded using a table look-up technique, or they can be determined from the gain values e.g. by a polynomial approximation. In order to account for the gain settings with $G_1$ and $G_2$ the moments may be scaled with these values as is shown by equations (5) and (15), i.e. the moments may be stored in a look-up table and they may then be multiplied with the gain factors according to these equations. Thus, the number of values to be stored may be not increased due to the additional gain settings. In another embodiment, possible gain factors are already taken into account in the look-up table, which increases the required memory space by a factor of possible G1/G2 values.

Additional optimizations may be possible when limiting to a transmitter as specified for 3GPP. Based on the specific properties of the scramblers 763a, 763b as specified for 3GPP, following relationships may hold $$\overline{a_1^4 \cdot b_1^2} \approx \overline{a_1^2 \cdot b_1^4} \approx \overline{a_1^6}/5; \overline{a_1^2 \cdot b_1^2} \approx \overline{a_1^4}/3$$

Thus, equation (15) may simplify to $$\overline{|s^6(t)|} = \frac{16}{5} G_1^6 \cdot \overline{a_1^6} + \frac{16}{5} G_2^6 \cdot \overline{a_2^6} + 48 G_1^4 G_2^2 \cdot \overline{a_1^4 \cdot a_2^2} + 48 G_1^2 G_2^4 \cdot \overline{a_2^4 \cdot a_1^2}$$ (16)

For transmit signal adaptation metric determination following expression may need to be evaluated $$\frac{\overline{|s(t)|^6}}{\overline{|s(t)|^2}^3} = \frac{\frac{16}{5} \cdot (G_1^6 \cdot \overline{a_1^6} + G_2^6 \cdot \overline{a_2^6}) + 48 \cdot G_1^2 \cdot G_2^2 \cdot (G_1^2 \cdot \overline{a_1^4 \cdot a_2^2} + G_2^2 \cdot \overline{a_2^4 \cdot a_1^2})}{[2 \overline{a_1^2} \cdot (G_1^2 + G_2^2)]^3}$$ (17)

$$= \frac{\frac{2}{5} \cdot (\overline{a_{1n}^6} + G_2^6/G_1^6 \cdot \overline{a_{2n}^6}) + 6 \cdot G_2^2/G_1^2 \cdot (\overline{a_{1n}^4} + G_2^2/G_1^2 \cdot \overline{a_{2n}^4})}{(1 + G_2^2/G_1^2)^3}$$

with $$\overline{a_{1/2n}^6} = \frac{\overline{a_{1/2}^6}}{\overline{a_1^2}^3}; \overline{a_{1/2n}^4} = \frac{\overline{a_{1/2}^4}}{\overline{a_1^2}^2};$$

Thus, only these normalized moments $\overline{|a_{1/2n}^6|}$ and $\overline{|a_{1/2n}^4|}$, i.e. the $4^{th}$ and the $6^{th}$ moments of the carrier signals, may be required for transmit signal adaptation metric computation in case of a 3GPP conform transmitter. Note that the allowed settings for the 2nd carrier may be a subset of the values for the 1st carrier. Thus, the same table can be used for both carriers.

It is to be understood that it may be only optimization of the calculation which is limited to the specification of 3GPP. The disclosure is not limited to DC-HSUPA, calculation of a combined transmit signal adaptation metric out of transmit signal adaptation metrics determined separately for each data stream is also possible under other specifications.

While the disclosure has been illustrated and described with respect to one or more implementations, alterations and/or modifications may be made to the illustrated examples without departing from the spirit and scope of the appended claims. In particular, with regard to the various functions performed by the above described components or structures, the terms used to describe such components are intended to correspond, unless otherwise indicated, to any component or structure which performs the specified function of the described component (e.g. that is functionally equivalent), even though not structurally equivalent to the disclosed structure which performs the function in the herein illustrated exemplary implementations of disclosure.

What is claimed is:

1. A method for adjusting a transmit power of a multi carrier transmitter in a mobile communication system, comprising:
   providing at least two data streams, wherein each data stream is configured to be transmitted on a separate carrier frequency;
   determining a transmit signal adaptation metric separately for each of the at least two data streams;
   determining the $4^{th}$ and $6^{th}$ moments for each of the at least two data streams;
   calculating a combined transmit signal adaptation metric based on the separate transmit signal adaptation metrics, wherein the combined transmit signal adaptation metric is based at least in part on the $4^{th}$ and $6^{th}$ moments for one or more of the at least two data streams;
   combining the two data streams carried on the two separate carrier frequencies to an overall transmit signal; and
   adjusting the transmit power of the overall transmit signal based on the calculated combined transmit signal adaptation metric,
   wherein each of the at least two data streams comprises at least one data channel and the $4^{th}$ and $6^{th}$ moments of each of the at least two data streams are determined based on gain and mode settings for the at least one data channel.

2. The method of claim 1, further comprising:
determining the transmit signal adaptation metric for each of the at least two data streams based on signal statistics of the respective data stream.

3. The method of claim 1, further comprising:
determining the transmit signal adaptation metric for each of the at least two data streams based on a raw cubic metric.

4. The method of claim 1, wherein the $4^{th}$ and $6^{th}$ moments of each of the at least two data streams are determined based on at least one of the following:
a computation by polynomial approximation;
a computation by interpolation; and
a computation by a mixture of two or more of the beforementioned computations.

5. The method of claim 1, wherein calculating the combined transmit signal adaptation metric takes into account a power imbalance between the at least two data streams.

6. The method of claim 1, wherein the mobile communication system is configured to operate according to a code division multiple access (CDMA) mode.

7. The method of claim 1, wherein the multi carrier transmitter is configured to operate according to a dual carrier-high speed uplink packed access (DC-HSUPA) mode.

8. A method for operating a multi carrier transmitter, comprising:
providing at least two data streams to be transmitted on the multi carriers, wherein each data stream comprises at least one data channel;
looking up predetermined transmit signal adaptation metrics in a look up table for each data stream based on a respective actual data stream configuration to ascertain separate transmit signal adaptation metrics;
determining the $4^{th}$ and $6^{th}$ moments for each of the at least two data streams;
calculating a combined transmit signal adaptation metric based on the separate transmit signal adaptation metrics, wherein the combined transmit signal adaptation metric is based at least in part on the $4^{th}$ and $6^{th}$ moments for one or more of the at least two data streams; and
adapting the at least two data streams to be transmitted on the multi carriers based on the calculated combined transmit signal adaptation metric in a feed forward manner,
wherein each of the at least two data streams comprises at least one data channel and the $4^{th}$ and $6^{th}$ moments of each of the at least two data streams are determined based on gain and mode settings for the at least one data channel.

9. The method of claim 8, further comprising:
using the same entries in the look-up table for the at least two data streams independently.

10. The method of claim 8, further comprising:
taking into account a power imbalance between the at least two data streams when calculating the combined transmit signal adaptation metric.

11. The method of claim 8, further comprising:
adapting the at least two data streams to be transmitted in a base band based on the calculated combined transmit signal adaptation metric.

12. The method of claim 8, further comprising:
adapting the at least two combined data streams to be transmitted in a radio frequency band based on the calculated combined transmit signal adaptation metric.

13. The method of claim 8, further comprising:
adjusting an amplification factor of a power amplifier amplifying a combined data stream formed by the at least two combined data streams combined in a radio frequency band based on the calculated combined transmit signal adaptation metric.

14. The method of claim 8, wherein the multi carrier transmitter is configured to operate according to a dual carrier-high speed uplink packed access (DC-HSUPA) mode.

15. A multi carrier transmitter for transmitting a respective data stream on each of the multiple carrier frequencies, the transmitter comprising:
a look up table configured to store pre-calculated transmit signal adaptation metric values for a data stream based on possible data stream configurations; and
a calculation unit configured to retrieve the transmit signal adaptation metric values from the look up table for each of multiple data streams to be transmitted based on an actual data stream configuration of each data stream, and calculate, based on the retrieved values, a combined transmit signal adaptation metric, wherein the combined transmit signal adaptation metric is based at least in part on the $4^{th}$ and $6^{th}$ moments for one or more of the respective data streams, and
wherein each of the respective data streams comprises at least one data channel and the $4^{th}$ and $6^{th}$ moments of each of the at least two data streams are determined based on gain and mode settings for the at least one data channel.

16. The multi carrier transmitter of claim 15, further comprising:
a power amplifier configured to amplify an overall transmit signal which comprises a combination of the data streams to be transmitted; and
an adjustment unit configured to adjust an amplification factor of the power amplifier based on the calculated combined transmit signal adaptation metric.

17. The multi carrier transmitter of claim 16, further comprising:
a digital front-end configured to combine the respective data streams to be transmitted in a base band, wherein the adjustment unit is further configured to adjust the data streams in the digital front-end according to the calculated combined transmit signal adaptation metric.

18. The multi carrier transmitter of claim 16, further comprising:
a radio frequency front-end configured to transfer the data streams to be transmitted into a radio frequency band, wherein the adjustment unit is further configured to adjust the data streams in the radio frequency front-end based on the calculated combined transmit signal adaptation metric.

* * * * *